United States Patent
Fujikawa et al.

(10) Patent No.: US 9,862,791 B2
(45) Date of Patent: Jan. 9, 2018

(54) IMPACT STRENGTH MODIFIER FOR CHLORINE-CONTAINING RESIN, CHLORINE-CONTAINING RESIN COMPOSITION AND MOLDED BODY OF CHLORINE-CONTAINING RESIN COMPOSITION

(71) Applicant: Mitsubishi Rayon Co., Ltd., Tokyo (JP)

(72) Inventors: Yuichiro Fujikawa, Otake (JP); Atsushi Kuwahara, Otake (JP); Ayaka Wakita, Otake (JP); Toshihiro Kasai, Toyohashi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 14/776,251

(22) PCT Filed: Mar. 15, 2013

(86) PCT No.: PCT/JP2013/057353
§ 371 (c)(1),
(2) Date: Sep. 14, 2015

(87) PCT Pub. No.: WO2014/141461
PCT Pub. Date: Sep. 18, 2014

(65) Prior Publication Data
US 2016/0039963 A1    Feb. 11, 2016

(51) Int. Cl.
| | |
|---|---|
| *C08L 27/06* | (2006.01) |
| *C08F 283/12* | (2006.01) |
| *C08L 27/04* | (2006.01) |
| *C08K 5/42* | (2006.01) |
| *C08L 51/08* | (2006.01) |

(52) U.S. Cl.
CPC ............... *C08F 283/12* (2013.01); *C08K 5/42* (2013.01); *C08L 27/04* (2013.01); *C08L 27/06* (2013.01); *C08L 51/085* (2013.01)

(58) Field of Classification Search
CPC ....... C08F 283/12; C08L 27/06; C08L 51/085
See application file for complete search history.

(56) References Cited

U.S. PATENT DOCUMENTS

| 8,497,323 B2 | 7/2013 | Wakita et al. | |
|---|---|---|---|
| 2006/0148946 A1* | 7/2006 | Lee | C08F 285/00 524/268 |
| 2008/0146743 A1* | 6/2008 | Minge | C08F 2/22 525/298 |
| 2009/0109538 A1* | 4/2009 | Kitayama | C08F 2/44 359/599 |
| 2011/0160401 A1* | 6/2011 | Wakita | C08F 2/22 525/100 |

FOREIGN PATENT DOCUMENTS

| JP | 10-036460 A | 2/1998 |
|---|---|---|
| JP | 10-310616 A | 11/1998 |
| JP | 2002-308997 A | 10/2002 |
| JP | 2006-526051 A | 11/2006 |
| JP | 2007-002046 A | 1/2007 |
| JP | 2007-204587 A | 8/2007 |
| JP | 2009-091540 A | 4/2009 |
| WO | 2005/012392 A1 | 2/2005 |
| WO | 2010/024311 A1 | 3/2010 |

OTHER PUBLICATIONS

Cheng et al. Journal of Applied Polymer Science, 124, 1117-1127 (2012).*
Office Action issued in corresponding Japanese Patent Application No. 2013-513429 dated Jun. 28, 2016.
International Search Report issued in corresponding International Patent Application No. PCT/JP2013/057353 dated May 21, 2013.

* cited by examiner

*Primary Examiner* — Richard A Huhn
(74) *Attorney, Agent, or Firm* — Morgan, Lewis & Bockius LLP

(57) ABSTRACT

Disclosed is an impact strength modifier (α) for a chlorine-containing resin, comprising a powder of a graft copolymer (A) obtained by graft polymerizing one or more kinds of vinyl monomers (b1) onto a polyorganosiloxane rubber (A1) or a composite rubber (A2) containing a polyorganosiloxane rubber and a polyalkyl(meth)acrylate rubber, wherein the specific surface area of the powder of the graft copolymer (A) measured by a nitrogen gas adsorption method is from 0.6 to 30 m²/g, and the pH of water used for extraction under conditions, in which (1) in an oven at 180° C., 5.0 g of the powder of the graft copolymer (A) is left to stand still and heated for 15 minutes, and (2) after the heating, the powder is dispersed in 100 ml of heated pure water and extracted for 1 hour at 70° C. while stirring, is from 4 to 11.

10 Claims, No Drawings

US 9,862,791 B2

IMPACT STRENGTH MODIFIER FOR CHLORINE-CONTAINING RESIN, CHLORINE-CONTAINING RESIN COMPOSITION AND MOLDED BODY OF CHLORINE-CONTAINING RESIN COMPOSITION

TECHNICAL FIELD

The present invention relates to an impact strength modifier which imparts an excellent low temperature impact strength to a chlorine-containing resin without deteriorating the processability thereof, a chlorine-containing resin composition comprising this impact strength modifier by blending, and a molded body of this chlorine-containing resin composition.

BACKGROUND ART

A chlorine-containing resin is a highly versatile resin, but it has a drawback of poor impact resistance. In particular, it is a great challenge of this resin to achieve both of the impact strength as well as other mechanical properties and the processability. So, a number of methods have been proposed in order to improve the impact resistance.

For example, it is disclosed that by blending particles of a silicone/acrylic composite rubber-based graft copolymer having a number average particle size of from 400 to 2000 nm and a proportion of the particles having a particle size of 300 nm or less in the entire particle size of 20% by volume or less into a chlorine-containing resin, the low temperature impact strength and high temperature mechanical properties are maintained and favorable processing characteristics, surface appearance of a molded product and coloring property may appear (Patent Document 1). However, there is a case in which the powder recovered by coagulation using a polyvalent metal salt as aggregating agent exhibits low dispersibility into a chlorine-containing resin compared to the powder recovered by spray and thus the resin does not sufficiently melt under usual molding conditions.

In order to improve this, for example, a rubbery polymer-containing material obtained by the spray recovery of a rubbery polymer containing a composite rubber composed of a polyorganosiloxane component and a polyalkyl(meth)acrylate component as a main component is disclosed (Patent Document 2). However, when the rubbery polymer-containing material is blended into a chlorine-containing resin, lubricity is imparted to the chlorine-containing resin to an excessive extent by the decomposition product of the emulsifier generated at the time of molding, thus the resin does not sufficiently melt under usual molding conditions, and as a result, a practically sufficient strength is not exerted in some cases.

As a technique to suppress the lubricity impartation by the decomposition product, for example, it is disclosed that the processability at the time of melt molding and impact resistance are improved without impairing the weather resistance by blending a graft copolymer (A) obtained by graft polymerizing a monomer mixture (a2) at from 0.1 to 50 parts by mass in the presence of an acrylic rubber (A1) at from 50 to 99.9 parts by mass [provided that the sum of (A1) and (a2) is 100 parts by mass] and in which the monomer mixture (a2) contains isobutyl methacrylate at from 1 to 99% by mass into a vinyl chloride resin (Patent Document 3). However, this technique is difficult to completely improve the lubricity imparted by the decomposition product derived from the emulsifier (surfactant) that is generated at the time of molding. In addition, the molded article thus obtained is also inferior in the low temperature impact strength required for a usual molded article.

PRIOR ART DOCUMENTS

Patent Documents

Patent Document 1: JP 2007-204587 A
Patent Document 2: JP 2002-308997 A
Patent Document 3: JP 2009-91540 A

SUMMARY OF THE INVENTION

Problem to be Solved by the Invention

An object of the invention is to provide an impact strength modifier which imparts an excellent low temperature impact strength to a chlorine-containing resin without deteriorating the processability thereof.

Means for Solving Problems

As a result of intensive investigations on the above object, the present inventors have found out that, when a silicone-based graft copolymer having a particular specific surface area and the pH of water that has been used for extraction of the powder under particular conditions within a particular range is blended into the chlorine-containing resin, it is possible to improve the low temperature impact strength of a chlorine-containing resin without deteriorating the processability thereof, thereby completing the invention.

The invention is given by the following respective items.

[1] An impact strength modifier ($\alpha$) for a chlorine-containing resin, wherein the impact strength modifier comprises a powder of a graft copolymer (A) obtained by graft polymerizing one or more kinds of vinyl monomers (b1) onto a polyorganosiloxane rubber (A1) or a composite rubber (A2) containing a polyorganosiloxane rubber and a polyalkyl(meth)acrylate rubber, and wherein
a specific surface area of the powder of the graft copolymer (A) measured by a nitrogen gas adsorption method is from 0.6 to 30 m$^2$/g and
a pH of water used for extraction under the following conditions is from 4 to 11.

(1) In an oven at 180° C., 5.0 g of the powder of the graft copolymer (A) is left to stand still and heated for 15 minutes, and (2) after the heating, the powder is dispersed in 100 ml of hot pure water and extracted for 1 hour at 70° C. while stirring.

[2] The impact strength modifier ($\alpha$) for a chlorine-containing resin according to [1], wherein the powder of the graft copolymer (A) is obtained by spray drying latex of the graft copolymer (A).

[3] The impact strength modifier ($\alpha$) for a chlorine-containing resin according to [1] or [2], wherein a content of an emulsifier having a thermal decomposition temperature measured by a TG/DTA measuring device of less than 200° C. is 0.1 parts by mass or less with respect to 100 parts by mass of the modifier ($\alpha$).

[4] The impact strength modifier ($\alpha$) for a chlorine-containing resin according to any one of [1] to [3], wherein the impact strength modifier comprises at least one kind of emulsifier selected from the group consisting of sodium

[5] The impact strength modifier (α) for a chlorine-containing resin according to any one of [1] to [4], wherein an amount of an organosiloxane contained in the powder of the graft copolymer (A) is 0.4% by mass or less.

[6] The impact strength modifier (α) for a chlorine-containing resin according to any one of [1] to [5], wherein the vinyl monomer (b1) is at least one kind of monomer selected from the group consisting of an aromatic alkenyl compound, an ester of (meth)acrylic acid and a vinyl cyanide compound.

[7] The impact strength modifier (α) for a chlorine-containing resin according to one of [1] to [6], wherein a gelation time of the powder of the graft polymer (A) measured under the following conditions is 215 seconds or shorter.

<Preparation of Formulation>
(a) 100 parts by mass of a vinyl chloride resin [Average polymerization degree of 1050, average particle size of 150 μm],
(b) 6.0 parts by mass of the powder of the graft copolymer (A),
(c) 3.0 parts by mass of a CaZn-based stabilizer,
(d) 5.0 parts by mass of calcium carbonate [Primary particle size of 50 nm, surface treatment agent: fatty acid], and
(e) 5.0 parts by mass of titanium dioxide [$TiO_2$ of 93%, average particle size of 0.25 μm, oil absorption of 21]
are blended, and in a 20 L Henschel mixer mounted a Z blade and a flat blade and heated to 40° C., are hot blended at a frequency of 65 Hz until the internal temperature thereof reaches 110° C. to obtain a formulation.

<Measurement Condition>
(1) The inside of the measuring device is heated to 180° C.
(2) Into the measuring device, 77.55 cc of the formulation is introduced, kept for 5 minutes, and kneaded at a rotation number of rotor of 30 rpm.
(3) The time required from the start of kneading to the point at which the maximum torque is exhibited is measured as the gelation time.

[8] A chlorine-containing resin composition, comprising the impact strength modifier (α) for a chlorine-containing resin according to any one of [1] to [7] and a chlorine-containing resin (β).

[9] The chlorine-containing resin composition according to [8], wherein the composition contains the impact strength modifier (α) for a chlorine-containing resin at from 0.1 to 30 parts by mass with respect to 100 parts by mass of the chlorine-containing resin (β).

[10] A molded body obtained by molding the chlorine-containing resin composition according to [8] or [9].

Effect of the Invention

The impact strength modifier of the invention can improve the low temperature impact strength of a chlorine-containing resin without deteriorating the processability thereof when being blended into and kneaded with the chlorine-containing resin.

MODE(S) FOR CARRYING OUT THE INVENTION

<Impact Strength Modifier (α) for Chlorine-Containing Resin>

The impact strength modifier (α) for a chlorine-containing resin of the invention comprises a powder of a graft copolymer (A) obtained by graft polymerizing one or more kinds of vinyl monomers (b1) onto a polyorganosiloxane rubber (A1) or a composite rubber (A2) containing a polyorganosiloxane rubber and a polyalkyl(meth)acrylate rubber.

<Polyorganosiloxane Rubber (A1)>

The polyorganosiloxane rubber (A1) used in the invention is a polymer containing an organosiloxane unit as a constituent unit. It is possible to use an arbitrary component such as a siloxane-based crosslinking agent, a siloxane-based graft linking agent, or a siloxane oligomer having a terminal sealing group if necessary together with an organosiloxane. Then, the polyorganosiloxane rubber (A1) is obtained by polymerizing an organosiloxane mixture containing these respective components.

As the organosiloxane, any of chain organosiloxanes and cyclic organosiloxanes can be used. In particular, cyclic organosiloxanes are preferable since they exhibit high polymerization stability and a faster polymerization speed. Among them, cyclic organosiloxanes having from 3- to 7-membered rings are preferable. Specific examples thereof include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, and octaphenylcyclotetrasiloxane. These may be used singly or two or more kinds thereof may be used concurrently. Among them, it is preferable to use octamethylcyclotetrasiloxane as a main component since it is easy to control the particle size distribution.

The siloxane-based crosslinking agent is preferably those which have a siloxy group. The use of the siloxane-based crosslinking agent makes it possible to obtain a polyorganosiloxane having a crosslinked structure. Specific examples of the siloxane-based crosslinking agent include a trifunctional or tetrafunctional silane-based crosslinking agent such as trimethoxymethylsilane, triethoxyphenylsilane, tetramethoxysilane, tetraethoxysilane, tetra-n-propoxysilane and tetrabutoxysilane. Among them, a tetrafunctional crosslinking agent is preferable and tetraethoxysilane is more preferable.

The content of the siloxane-based crosslinking agent is preferably from 0.1 to 30% by mass with respect to 100% by mass of the organosiloxane mixture.

The siloxane-based graft linking agent is a compound having a siloxy group and a functional group that is polymerizable with a vinyl monomer. The use of the siloxane-based graft linking agent can obtain a polyorganosiloxane rubber having a functional group that is polymerizable with a vinyl monomer. Such a polyorganosiloxane rubber permits that the alkyl(meth)acrylate rubber component and the vinyl monomer (b1) which are to be described later are grafted thereon by radical polymerization. Specific examples of the siloxane-based graft linking agent include a siloxane compound represented by the following Formula (I).

$$RSiR^1{}_n(OR^2)_{(3-n)} \quad (I)$$

[In Formula (I), $R^1$ represents a methyl group, an ethyl group, a propyl group or a phenyl group. $R^2$ represents an organic group (for example, a methyl group, an ethyl group, a propyl group or a phenyl group) in an alkoxy group. n is 0, 1 or 2. R represents any functional group represented by the following Formulas (I-1) to (I-4).]

$$CH_2{=}C(R^3){-}COO{-}(CH_2)_p{-} \quad (I\text{-}1)$$

$$CH_2{=}C(R^4){-}C_6H_4{-} \quad (I\text{-}2)$$

$$CH_2{=}CH{-} \quad (I\text{-}3)$$

$$HS{-}(CH_2)_p{-} \quad (I\text{-}4)$$

[In Formulas (I-1) to (I-4), $R^3$ and $R^4$ each independently represent hydrogen or a methyl group. p represents an integer from 1 to 6.]

Examples of the functional group represented by Formula (I-1) include a methacryloyloxyalkyl group. In case R is a functional group represented by Formula (I-1), specific examples of the siloxane-based graft linking agent include β-methacryloyloxyethyldimethoxymethylsilane, γ-methacryloyloxypropylmethoxydimethylsilane, γ-methacryloyloxypropyldimethoxymethylsilane, γ-methacryloyloxypropyltrimethoxysilane, γ-methacryloyloxypropylethoxydiethylsilane, γ-methacryloyloxypropyldiethoxymethylsilane, and δ-methacryloyloxybutyldiethoxymethylsilane.

Examples of the functional group represented by Formula (I-2) include a vinylphenyl group. In case R is a functional group represented by Formula (I-2), specific examples of the siloxane-based graft linking agent include vinylphenylethyldimethoxysilane.

The functional group represented by Formula (I-3) is a vinyl group. In case R is a functional group represented by Formula (I-3), specific examples of the siloxane-based graft linking agent include vinyltrimethoxysilane and vinyltriethoxysilane.

Examples of the functional group represented by Formula (I-4) include a mercaptoalkyl group. In case R is a functional group represented by Formula (I-4), specific examples of the siloxane-based graft linking agent include γ-mercaptopropyldimethoxymethylsilane, γ-mercaptopropylmethoxydimethylsilane, γ-mercaptopropyldiethoxymethylsilane, γ-mercaptopropylethoxydimethylsilane, and γ-mercaptopropyltrimethoxysilane.

These siloxane-based graft linking agents may be used singly or two or more kinds thereof may be used concurrently.

The content of the siloxane-based graft linking agent is preferably from 0.05 to 20% by mass in 100% by mass of the organosiloxane mixture.

The siloxane oligomer having a terminal sealing group is an organosiloxane oligomer having a sealing group such as an alkyl group at the terminal of the molecule. By using this, the polymerization degree of the polyorganosiloxane can be adjusted as desired. Specific examples of the siloxane oligomer having a terminal sealing group include an oligomer such as hexamethyldisiloxane, 1,3-bis(3-glycidoxypropyl) tetramethyldisiloxane, 1,3-bis(3-aminopropyl)tetramethyldisiloxane, or methoxytrimethylsilane. The content of the siloxane oligomer having a terminal sealing group is not particularly limited, but it may be appropriately used as desired.

The method for producing the polyorganosiloxane rubber (A1) is not particularly limited. For example, it is possible to employ the following method.

First, an organosiloxane mixture which contains the organosiloxane and arbitrary components such as the siloxane-based crosslinking agent, the siloxane-based graft linking agent, and the siloxane oligomer having a terminal sealing group if necessary is emulsified with an emulsifier (c) and water to prepare an emulsion. This is polymerized at a high temperature using an acid catalyst, and subsequently the acid is neutralized with an alkaline substance, thereby obtaining the polyorganosiloxane latex.

Examples of the method for preparing the emulsion include a method using a homomixer which micronizes the particles by a shear force caused by high speed rotation and a method mixing the materials by high speed stirring using a homogenizer which micronizes the particles by a jetting force caused by a high pressure generator. In particular, the method using a homogenizer is preferable since the particle size distribution of the polyorganosiloxane latex narrows.

The emulsifier (c) used in preparing the emulsion is not particularly limited as long as the organosiloxane can be emulsified, and a known emulsifier can be used, and an anionic emulsifier or a nonionic emulsifier is preferable.

It is preferable that an emulsifier which has a thermal decomposition temperature measured by a TG/DTA measuring device of lower than 200° C. is not used in a large amount as the emulsifier (c). It is preferable that the amount of the emulsifier having a thermal decomposition temperature of lower than 200° C. is eventually 0.1 part by mass or less with respect to 100 parts by mass of the modifier (α). It is possible to suppress the deterioration in processability by the thermal decomposition product of the emulsifier (c) when kneading the impact strength modifier containing the emulsifier (c) and the chlorine-containing resin (β) as the emulsifier (c) having a thermal decomposition temperature of lower than 200° C. is not used in a great amount.

In particular, it is preferable to use an emulsifier having a thermal decomposition temperature of from 200 to 400° C. as the emulsifier (c). It is possible to suppress the deterioration in processability by the thermal decomposition product of the emulsifier (c) in kneading the impact strength modifier containing the emulsifier (c) and the chlorine-containing resin (β) as the emulsifier (c) having a thermal decomposition temperature of 200° C. or higher is used. As the emulsifier (c), it is more preferable to use an emulsifier having a thermal decomposition temperature of 230° C. or higher and it is particularly preferable to use an emulsifier having a thermal decomposition temperature of 250° C. or higher. The thermal decomposition temperature of the emulsifier (c) is preferably 400° C. or lower and more preferably 350° C. or lower from the viewpoint that the emulsifier is easily available.

As the thermal decomposition temperature of the emulsifier (c) can adopt the value at which the mass is decreased by 3% when the mass decrease rate is measured using a TG/DTA measuring device. As the method for measuring the thermal decomposition temperature, the measurement of the mass decrease rate is conducted using the emulsifier (c) of which the moisture content is adjusted to 1.0% or less by removing the moisture in a steam dryer at 70° C. as the specimen and the TG/DTA 6200 [Measuring device manufactured by Seiko Instruments Inc.]. As the measurement condition, the emulsifier is kept for 5 minutes at 120° C. under an atmosphere of Air=200 ml/min and then subjected to the measurement at a temperature increasing speed of 15° C./min from 120° C. to 550° C., and the temperature at which the mass of the emulsifier is decreased by 3% with respect to 100% of the mass of the emulsifier before measurement is adopted as the thermal decomposition temperature of the emulsifier (c).

Examples of the emulsifier (c) include an anionic emulsifier and a nonionic emulsifier other than a salt of sulfuric acid ester. Specific examples of the anionic emulsifier include sodium alkylbenzenesulfonate, sodium alkyl diphenyl ether sulfonate and sodium alkylsulfosuccinate. Specific examples of the nonionic emulsifier include polyoxyethylene alkyl ether, polyoxyethylene alkylene alkyl ether, polyoxyethylene distyrenated phenyl ether, polyoxyethylene tribenzyl phenyl ether and polyoxyethylene polyoxypropylene glycol. These may be used singly or two or more kinds thereof may be used concurrently.

In particular, sodium dodecylbenzenesulfonate, sodium alkyl diphenyl ether disulfonate, sodium dialkylsulfosuccinate and polyoxyethylene distyrenated phenyl ether are more preferable since these thermal decomposition temperatures are 200° C. or higher.

The amount of the emulsifier (c) used is preferably from 0.05 to 10 parts by mass and more preferably from 0.1 to 5 parts by mass with respect to 100 parts by mass of the organosiloxane mixture. The particle size to a desired value can be adjusted by the amount of the emulsifier (c) used. The dispersion stability of the emulsion is obtained and the polymerization of the polyorganosiloxane rubber becomes easy when the amount of the emulsifier used is 0.05 parts by mass or more. In addition, the amount of the emulsifier (c) remaining in the powder of the graft copolymer (A) is never too much when the amount of the emulsifier used is 10 parts by mass or less, and thus the processability and the bleedout resistance when it is blended into the chlorine-containing resin (β) are improved.

The method for mixing an acid catalyst at the time of polymerization is not particularly limited. Examples thereof include a method adding an aqueous solution of the acid catalyst together with the organosiloxane mixture, the emulsifier and water at once and mix them, a method adding an aqueous solution of the acid catalyst into the emulsion of the organosiloxane mixture at once, and a method adding the emulsion of the organosiloxane mixture into an aqueous solution of the acid catalyst having a high temperature dropwise at a constant speed and mixing them. The polymerization temperature is preferably 50° C. or higher and more preferably 70° C. or higher. The polymerization time is generally 2 hours or longer and preferably 5 hours or longer, for example, in case of conducting the polymerization by adding an aqueous solution of the acid catalyst into the emulsion of the organosiloxane mixture at once.

Furthermore, since the crosslinking reaction between the silanols proceeds at a temperature of 30° C. or lower, the crosslink density of the polyorganosiloxane can be increased by keeping the materials for about 5 hours to 100 hours at a temperature of 30° C. or lower.

The polymerization reaction of the polyorganosiloxane rubber can be terminated by neutralizing the latex to have a pH of from 6 to 8 with an alkaline substance such as sodium hydroxide, potassium hydroxide and an aqueous ammonia solution.

Specific examples of the acid catalyst used in the polymerization of the polyorganosiloxane rubber include sulfonic acid such as aliphatic sulfonic acid, aliphatic substituted benzenesulfonic acid and aliphatic substituted naphthalenesulfonic acid; and a mineral acid such as sulfuric acid, hydrochloric acid and nitric acid. These may be used singly or two or more kinds thereof may be used concurrently. Among them, aliphatic substituted benzenesulfonic acid is preferable.

<Composite Rubber (A2)>

The composite rubber (A2) used in the invention comprises a polyorganosiloxane rubber and a polyalkyl(meth)acrylate rubber and is a rubber obtained by compounding these.

The polyorganosiloxane rubber constituting the composite rubber (A2) is preferably the same as the polyorganosiloxane rubber (A1) previously described.

The polyalkyl(meth)acrylate constituting the composite rubber (A2) is obtained by polymerizing an alkyl(meth)acrylate component (hereinafter, abbreviated as the "(meth)acrylate component for composite rubber"). The (meth)acrylate component for composite rubber usually contains an alkyl(meth)acrylate and a crosslinkable monomer.

Specific examples of the alkyl(meth)acrylate include ethyl acrylate, n-propyl acrylate, n-butyl acrylate, i-butyl acrylate and 2-ethylhexyl acrylate. These may be used singly or two or more kinds thereof may be used concurrently. Among them, n-butyl acrylate is preferable from the viewpoint of impact resistance of the thermoplastic resin composition.

Specific examples of the crosslinkable monomer include polyfunctional monomers such as allyl methacrylate, triallyl cyanurate, triallyl isocyanurate, divinyl benzene, ethylene glycol dimethacrylate, propylene glycol dimethacrylate, 1,3-butylene glycol dimethacrylate, 1,4-butylene glycol dimethacrylate, 1,6-hexanediol diacrylate and triallyl trimellitate. These may be used singly or two or more kinds thereof may be used concurrently.

The content of the polyorganosiloxane rubber in the composite rubber (A2) is preferably from 1 to 30% by mass and more preferably from 3 to 15% by mass in 100% by mass of the composite rubber (A2). Sufficient impact resistance is obtained when this content is 1% by mass or more. In addition, it is possible to excellently maintain various kinds of properties including processability when this content is 30% by mass or less.

The method for producing the composite rubber (A2) is not particularly limited. For example, it can be produced by an emulsion polymerization method, a suspension polymerization method, a micro-suspension polymerization method. Among them, an emulsion polymerization method is preferable. As the method for producing the composite rubber (A2) by the emulsion polymerization method, particularly, a method obtaining the latex of the composite rubber (A2) by the emulsion polymerization of the (meth)acrylate component for composite rubber in the presence of the latex of the polyorganosiloxane rubber is preferable.

As the method for adding the (meth)acrylate component for composite rubber to the latex of the polyorganosiloxane rubber, for example, there is a method comprising first adding the (meth)acrylate component for composite rubber into the latex of the polyorganosiloxane rubber and after it is impregnated into the polyorganosiloxane rubber, polymerizing by the action of a known radical polymerization initiator. Adding the (meth)acrylate component for composite rubber may be, for example, its entire amount at once or dropwise with constant rate.

When preparing the latex of the composite rubber (A2), it is possible to add an emulsifier (c) in order to stabilize the latex and to control the particle size of the composite rubber. This emulsifier (c) is not particularly limited, but a known emulsifier can be used, and it is preferable that the emulsifier (c) is the same kind as and used in the same amount as those exemplified as the emulsifier (c) for the production of the polyorganosiloxane rubber (A1) previously described.

A radical polymerization initiator is usually used for the polymerization of the (meth)acrylate component for composite rubber. Examples of the radical polymerization initiator include an azo-based initiator, a peroxide, and a redox initiator prepared by combining a peroxide with an oxidant and/or a reductant. These may be used singly or two or more kinds thereof may be used concurrently. Among them, a redox initiator is preferable.

Specific examples of the azo-based initiator include an oil-soluble azo-based initiator such as 2,2'-azobisisobutyronitrile and dimethyl 2,2'-azobis(2-methylpropionate); and a water-soluble azo-based initiator such as 4,4'-azobis(4-cyanovaleric acid), 2,2'-azobis[N-(2-carboxymethyl)-2-methylpropionamidine]hydrate, 2,2'-azobis(N,N'-dimethyleneisobutylamidine)dihydrochloride and 2,2'-azobis[2-(2- imidazolin-2-yl)propane]dihydrochloride. These may be used singly or two or more kinds thereof may be used concurrently.

Specific examples of the peroxide include an inorganic peroxide such as hydrogen peroxide, potassium persulfate and ammonium persulfate; and an organic peroxide such as diisopropylbenzene hydroperoxide, p-menthane hydroperoxide, cumene hydroperoxide, t-butyl hydroperoxide, succinic acid peroxide, t-butyl peroxyneodecanoate, t-butyl peroxyneoheptanoate, t-butyl peroxypivalate, 1,1,3,3-tetramethylbutyl peroxy-2-ethylhexanoate and t-butyl peroxy-2-ethylhexanoate. These may be used singly or two or more kinds thereof may be used concurrently. Among them, an organic peroxide is preferable.

Examples of the redox initiator include an initiator prepared by combining a peroxide with a reductant. In particular, redox initiators prepared by combining the peroxides listed above with a reductant such as sodium formaldehyde sulfoxylate, L-ascorbic acid, fructose, dextrose, sorbose and inositol, ferrous sulfate and ferrous sulfate and ethylenediaminetetraacetic acid disodium salt are preferable. Among them, a combination of sodium formaldehyde sulfoxylate, ferrous sulfate and ethylenediaminetetraacetic acid disodium salt is more preferable.

The content of the polyorganosiloxane rubber (A1) (the polyorganosiloxane rubber (A1) in the composite rubber (A2) in case of using the composite rubber (A2)) in the graft polymer (A) is preferably from 1 to 40% by mass, more preferably from 5 to 35% by mass, even more preferably from 5 to 30% by mass, and particularly preferably from 5 to 25% by mass in 100% by mass of the graft copolymer (A) in order to decrease the residual organosiloxane and to shorten the gelation time.

The content of the composite rubber (A2) in the graft polymer (A) is preferably from 40 to 99% by mass and more preferably from 60 to 95% by mass in 100% by mass of the graft copolymer (A). The low temperature impact resistance is improved when this content is 40% by mass or more. In addition, it is possible to maintain various excellent properties including processability when this content is 99% by mass or less.

<Vinyl Monomer (b1)>

The vinyl monomer (b1) used in the invention is a monomer to be graft polymerized onto the polyorganosiloxane rubber (A1) or the composite rubber (A2). Specific examples of the vinyl monomer (b1) include an aromatic alkenyl compound such as styrene, a-methylstyrene and vinyl toluene; an ester of (meth)acrylic acid such as methyl (meth)acrylate, ethyl(meth)acrylate, butyl(meth)acrylate and 2-ethylhexyl(meth)acrylate; a vinyl cyanide compound such as acrylonitrile and methacrylonitrile. These may be used singly or two or more kinds thereof may be used concurrently.

<Powder of Graft Polymer (A)>

The powder of the graft polymer (A) used in the invention is a powder of a graft copolymer obtained by graft polymerizing one or more kinds of the vinyl monomers (b1) onto the polyorganosiloxane rubber (A1) or the composite rubber (A2) described above.

For example, the latex of the graft polymer (A) is obtained by adding the vinyl monomer (b1) to the latex of the polyorganosiloxane rubber (A1) or the composite rubber (A2) and conducting the polymerization in single step or multiple steps by a radical polymerization method.

Examples of the radical polymerization initiator used in the graft polymerization include a peroxide, an azo-based initiator, a redox initiator prepared by combining an oxidant and a reductant. Among them, a redox initiator is preferable, and in particular a redox initiator prepared by combining ferrous sulfate, ethylenediaminetetraacetic acid disodium salt, Rongalite and hydroperoxide is preferable.

It is possible to add various kinds of chain transfer agents and graft linking agents to the vinyl monomer (b1) in order to adjust the molecular weight and graft rate of the graft polymer.

It is possible to further add an emulsifier (c) at the time of the graft polymerization in order to stabilize the latex and to control the average particle size of the particles. This emulsifier (c) is not particularly limited, but a known emulsifier can be used, and an emulsifier which is the same kind as those exemplified as the emulsifier (c) for the production of the polyorganosiloxane rubber (A1) previously described is preferable.

The mass average particle size of the graft copolymer (A) thus obtained is preferably from 50 to 2000 nm from the viewpoint that the low temperature impact strength and surface appearance of the molded body are favorable. The low temperature impact strength of the molded body is favorable when the mass average particle is 50 nm or more, and the impact resistance and surface appearance of the molded body are favorable when the mass average particle is 2000 nm or more. The range of the mass average particle size of the graft copolymer (A) is more preferably from 100 to 1000 nm, and it is particularly preferably from 150 to 800 nm from the viewpoint of an excellent balance between low temperature impact strength and surface appearance.

The method for recovering the graft polymer (A) from the latex after the graft polymerization is completed is not particularly limited. For example, a known method such as a spray recovery method, a coagulation method, a centrifugal separation method and a freeze-drying method can be used. In particular, a coagulation method and a spray recovery method are preferable and a spray recovery method is more preferable since the powder of the graft copolymer (A) thus obtained has a high specific surface area.

The specific surface area of the powder of the graft copolymer (A) measured by the nitrogen gas adsorption method is from 0.6 to 30 $m^2/g$. When this specific surface area is 0.6 $m^2/g$ or more, the powder of the graft copolymer (A) exhibits excellent dispersibility at the time of being kneaded with the chlorine-containing resin (β) because excellent processability is exerted. In addition, deterioration in processability due to aggregation of the powder of the graft copolymer (A) at the time of being kneaded with the chlorine-containing resin (β) is suppressed when the specific surface area is 30 $m^2/g$ or less. The specific surface area of the powder of the graft copolymer (A) is preferably from 1.0 to 25 $m^2/g$, and more preferably in a range of from 2.0 to 20 $m^2/g$.

The value of this specific surface area is measured after the powder of the graft copolymer (A) (volume: 0.6 $cm^3$) is introduced into the sample tube for measurement and vacuum-dried for 12 hours at 70° C. using a specific surface area and pore distribution measuring device [Product name: Belsorp, manufactured by NIPPON BEL, Co.]. In this measurement, it is possible to adopt the value of the specific surface area calculated by the BET method of the following Equation (II).

$$P/[V(P_0-P)]=[1/(VmC)]+[(C-1)/(VmC)][P/P_0] \qquad \text{(II)}$$

P: Adsorption equilibrium pressure
$P_0$: Saturated vapor pressure
V: Adsorbed amount Vm: Adsorbed amount of monomolecular layer, adsorbed amount when gaseous molecule forms monomolecular layer on fixed surface C: Parameter of heat of adsorption>0

Specifically, the specific surface area of the powder of the graft copolymer (A) can be calculated from the adsorbed amount of monomolecular layer, Vm, obtained by Equation (II) above and the known cross-sectional area occupied by the molecules of nitrogen gas.

In order to control the specific surface area in the above range, a method coagulating the latex having a mass average particle size of from 50 to 100 nm using a coagulant and a method recovering the latex having a mass average particle size of from 50 to 800 nm by spraying may be mentioned.

In the spray recovery, it is possible to recover the powder of graft copolymer particles (A) by further adding an emulsifier (c) to the latex obtained if necessary and then spray-drying the latex. This emulsifier (c) is not particularly limited, but a known emulsifier can be used, and an emulsifier which is the same kind as those exemplified as the emulsifier (c) for the production of the polyorganosiloxane rubber (A1) previously described is preferable.

The temperature condition of the spray drying is not particularly limited, but in consideration of handleability of the powder and the residual moisture rate in the powder, it is preferable that the outlet temperature of the spray drier is equal to or higher than the higher temperature either [Tg−5° C.] or [60° C.], where Tg denotes the glass transition temperature of the graft copolymer (A), from the viewpoint that the powder is sufficiently dried. In addition, the outlet temperature thereof is preferably [Tg+20° C.] or lower from the viewpoint of suppressing that the recovery rate of the powder is decreased by fusing onto the inside of the device.

The volume average particle size of the powder of the graft copolymer (A) is preferably 200 μm or less, more preferably 190 μm or less, and even more preferably 100 μm or less. When this volume average particle size is 200 μm or less, the powder of the graft copolymer (A) exhibits excellent dispersibility at the time of being kneaded with the chlorine-containing resin (β) and thus excellent processability is exerted.

The pH of water used for extraction of the powder of the graft copolymer (A) under the following conditions is from 4 to 11.

(1) In an oven at 180° C., 5.0 g of the powder of the graft copolymer (A) is left to stand still and heated for 15 minutes, and (2) after the heating, the powder is dispersed in 100 ml of hot pure water and extracted for 1 hour at 70° C. while stirring.

When the pH of water used for extraction is from 4 to 11, it is possible to suppress the hydrolysis of the polyorganosiloxane rubber in the graft copolymer (A) and to suppress deterioration in processability and a decrease in low temperature impact strength of the chlorine-containing resin. The pH of water used for extraction is more preferably from 4 to 9 and particularly preferably from 4 to 7.

The method for measuring the pH is as follows. In a hot air circulation type dryer at 180° C., 5.0 g of the powder of the graft copolymer (A) is left to stand still and heated for 15 minutes and then dispersed in 100 ml of hot pure water and extracted for 1 hour at 70° C. while stirring. The water used for the extraction is filtered through a 0.2 μm membrane filter produced by an cellulose mixed ester. This filtrate is used as a specimen and the its pH is measured by the following measuring device, and the value measured is adopted as the pH used for the extraction.

Device: pH Meter, model F-52 [HORIBA, Ltd.]
Electrode: Model 9611 [HORIBA, Ltd.]
Internal solution of reference electrode: 3.33 mol/l KC solution [HORIBA, Ltd.]
pH Standard solution: pH 4.00, pH 6.88, and pH 9.18 (25° C.)

To control the pH of water used for extraction in the above range, it is mentioned that the amount of the emulsifier having a thermal decomposition temperature measured by a TG/DTA measuring device of lower than 200° C. used is made below 0.1 part by mass or so with respect to 100 parts by mass of the modifier (α), and that the amount of coagulant to lower the pH used is decreased. As the method for decreasing the amount of coagulant to lower the pH used, conducting the recovery of the graft copolymer (A) by a spray recovery method and using a coagulant which is not a sulfate salt-based coagulant such as aluminum sulfate but an acetate salt-based coagulant or a phosphate salt-based coagulant even in case of conducting the recovery by a coagulation method may be mentioned.

The organosiloxane contained in the graft copolymer (A) exerts an action as a lubricant when the graft copolymer (A) is kneaded with the chlorine-containing resin (β). Hence, the content of the organosiloxane contained in the graft copolymer (A) is preferably 0.4% by mass or less, and more preferably 0.2% by mass or less in 100% by mass of the graft copolymer (A). The deterioration in processability can be suppressed when the content of the organosiloxane is decreased in this manner.

The method for measuring the content of the organosiloxane is as follows. Into a 50 ml sample tube, 0.3 g of the powder of the graft copolymer (A) is weighed and 20 ml of acetone and 5 μL of butyl acetate are weighed and put in to the sample tube. This is used as a specimen and the content of the organosiloxane is measured by the following measuring device, and the value measured is adopted as the content of the organosiloxane.

Device: Gas chromatograph (GC) [HP6890 manufactured by Agilent Technologies Japan, Lid.]
Capillary column: DB-WAX
Column oven: 40° C./5 min, raising at 10° C./min, 140° C./0 min, raising at 20° C./min, 220° C./1 min, post-run=230° C./2 min, column flow rate (He)=2.3 ml/min, average linear velocity=36 cm/sec
Inlet: Temperature=200° C.
Detector: Temperature=200° C., hydrogen flow rate=40 ml/min, air flow rate=450 ml/min, make-up flow rate (He) =45 ml/min
Injection amount: 1 μl As the method for controlling the amount of the organosiloxane in the above range, the following methods are mentioned. The content of the organosiloxane rubber (A1) in the graft polymer (A) (the polyorganosiloxane rubber (A1) in the composite rubber (A2) in case of using the composite rubber (A2)) is set to 25% by mass or less in 100% by mass of the graft copolymer (A).

The gelation time of the powder of the graft polymer (A) measured under the following conditions is preferably 215 seconds or shorter, and more preferably 210 seconds or shorter.

<Preparation of Formulation>

(a) 100 parts by mass of a vinyl chloride resin [Average polymerization degree of 1050, average particle size of 150 μm], (b) 6.0 parts by mass of the powder of the graft copolymer (A), (c) 3.0 parts by mass of a CaZn-based stabilizer,
(d) 5.0 parts by mass of calcium carbonate [Primary particle size of 50 nm, surface treatment agent: fatty acid], and
(e) 5.0 parts by mass of titanium dioxide [$TiO_2$ of 93%, average particle size of 0.25 μm, oil absorption of 21] are mixed, and after a Z blade and a flat blade are mounted to a 20 L Henschel mixer heated to 40° C., the mixture is being hot blended at a frequency of 65 Hz until the internal temperature thereof reaches 110° C. to obtain a formulation.

<Measurement Condition>

(1) The inside of the measuring device is heated to 180° C.

(2) Into the measuring device, 77.55 cc of the formulation is introduced, kept for 5 minutes and then kneaded at a rotation number of rotor of 30 rpm.

(3) The time required from the start of kneading to the point at which the maximum torque is exhibited is measured as the gelation time.

The graft polymer (A) may be used singly, or two or more kinds of different powders (for example, powders different in particle size, composition or specific surface area) may be used concurrently.

<Chlorine-Containing Resin (β)>

The chlorine-containing resin (β) used in the invention is not particularly limited, but a known resin can be used. The method for producing the chlorine-containing resin (β) is also not particularly limited, but for example, a known polymerization method such as bulk polymerization, solution polymerization, suspension polymerization and emulsion polymerization may be used.

The chlorine-containing resin (β) is typically a thermoplastic resin such as a vinyl chloride-based resin. Examples of the vinyl chloride-based resin may include a vinyl chloride resin and a resin obtained by chlorinating a vinyl chloride resin (chlorinated vinyl chloride resin). The invention especially exerts an effect in case of containing a vinyl chloride resin at 80% by mass or more among them.

Specific examples of the chlorine-containing resin (β) include a vinyl chloride-based resin such as polyvinyl chloride, chlorinated polyvinyl chloride, polyvinylidene chloride, chlorinated polyethylene, a vinyl chloride-vinyl acetate copolymer, a vinyl chloride-ethylene copolymer, a vinyl chloride-propylene copolymer, a vinyl chloride-styrene copolymer, a vinyl chloride-isobutylene copolymer, a vinyl chloride-vinylidene chloride copolymer, a vinyl chloride-styrene-anhydrous maleic acid terpolymer, a vinyl chloride-styrene-acrylonitrile copolymer, a vinyl chloride-butadiene copolymer, a vinyl chloride-isoprene copolymer, a vinyl chloride-chlorinated propylene copolymer, a vinyl chloride-vinylidene chloride-vinyl acetate terpolymer, a vinyl chloride-maleic acid ester copolymer, a vinyl chloride-methacrylic acid ester copolymer, a vinyl chloride-acrylonitrile copolymer and a vinyl chloride-vinyl ether copolymer. In addition, the chlorine-containing resin (β) may be a blended product of two or more kinds of vinyl chloride-based resins. Furthermore, the chlorine-containing resin (β) may be a blended product of a vinyl chloride-based resin with another synthetic resin which does not contain chlorine (for example, an acrylonitrile-styrene copolymer, an acrylonitrile-butadiene-styrene copolymer, an ethylene-vinyl acetate copolymer, an ethylene-ethyl(meth)acrylate copolymer, polyester etc.). In addition, the chlorine-containing resin (β) may be a block copolymer or a graft copolymer thereof.

The average polymerization degree of the vinyl chloride-based resin is preferably from 600 to 1500, and more preferably from 800 to 1300. A sufficient mechanical strength is obtained when this average polymerization degree is 600 or more, and it is easy to process the resin composition when this average polymerization degree is 1500 or less.

Examples of the commercially available vinyl chloride-based resin include TK-800, TK-1000 and TK-1300 manufactured by Shin-Etsu Chemical Co., Ltd., TH-800, TH-1000 and TH-1300 manufactured by Taiyo Vinyl Corporation, and S-1008, S-1001 and S-1003 manufactured by Kaneka Corporation (all are a trade name).

In case of using a chlorinated vinyl chloride resin, the chlorination degree thereof is preferably from 50 to 70% by mass, more preferably from 60 to 70% by mass, and particularly preferably from 65 to 70% by mass. A resin composition exhibiting sufficient heat resistance is obtained when this chlorination degree is 50% by mass or more. In addition, the melt viscosity required for processing the resin composition can be maintained when the chlorination degree is 70% by mass or less. As the vinyl chloride resin that is the starting material of the chlorinated vinyl chloride resin, those which are previously exemplified are preferable.

In case of using the resin obtained by chlorinating a vinyl chloride resin (chlorinated vinyl chloride resin), the chlorination degree thereof is preferably from 50 to 70% by mass, more preferably from 60 to 70% by mass, and particularly preferably from 65 to 70% by mass. A resin composition exhibiting sufficient heat resistance is obtained when this chlorination degree is 50% by mass or more. In addition, the melt viscosity required for processing the resin composition can be maintained when the chlorination degree is 70% by mass or less. As the vinyl chloride resin that is the starting material of the chlorinated vinyl chloride-based resin, those which are previously exemplified are preferable.

Examples of the commercially available chlorinated vinyl chloride-based resin include HA-05K, HA-24F, HA-22H, HA-53K and HA-27F manufactured by SEKISUI CHEMICAL CO., LTD., and H-516A, H-527, H-627, H-827 and H-829 manufactured by Kaneka Corporation (all are a trade name).

<Chlorine-Containing Resin Composition>

The chlorine-containing resin composition of the invention is a composition comprising the impact strength modifier (α) and the chlorine-containing resin (β) described above. The impact strength of the chlorine-containing resin composition is improved by blending the impact strength modifier (α) into the chlorine-containing resin (β).

In this chlorine-containing resin composition, the content of the graft copolymer (A) constituting the impact strength modifier (α) is not particularly limited, but it may be decided depending on the desired impact strength. In particular, the content of the graft copolymer (A) is preferably from 0.1 to 30 parts by mass, more preferably from 1 to 20 parts by mass, and most preferably from 3 to 10 parts by mass with respect to 100 parts by mass of the chlorine-containing resin (β). The low temperature impact strength is favorably exerted when the content is 0.1 parts by mass or more, and it is possible to excellently maintain various kinds of properties including processability when the content is 30 parts by mass or less.

It is possible to add various kinds of additives such as a stabilizer, a lubricant, a filler, a flame retardant, a mold releasing agent, a fluidity improving agent, a colorant, an antistatic agent, a surfactant, an antifogging agent and an antimicrobial agent to the chlorine-containing resin composition of the invention according to the purpose thereof as long as the physical properties are not impaired.

Examples of the stabilizer include a lead-based stabilizer such as tribasic lead sulfate, dibasic lead phosphite, basic lead sulfite and lead silicate; a metal soap-based stabilizer derived from a metal such as potassium, magnesium, barium, zinc, cadmium and lead and a fatty acid such as 2-ethylhexanoic acid, lauric acid, myristic acid, palmitic acid, stearic acid, isostearic acid, hydroxystearic acid, oleic acid, ricinoleic acid, linoleic acid and behenic acid; an organic tin-based stabilizer having an alkyl group, an ester group, a fatty acid group, a maleic acid group, a sulfur-containing group etc.; a composite metal soap-based stabilizer such as a Ba—Zn-based stabilizer, a Ca—Zn-based stabilizer, a Ba—Ca—Sn-based stabilizer, a Ca—Mg—Sn-based stabilizer, a Ca—Zn—Sn-based stabilizer, a Pb—Sn-based stabilizer and a Pb—Ba—Ca-based stabilizer; a metal salt-based stabilizer derived from a metal group such as barium and zinc and usually two or more kinds of organic acids for example, a branched fatty acid such as 2-ethylhexanoic acid, isodecanoic acid and a trialkylacetic acid, an unsaturated fatty acid such as oleic acid, ricinoleic acid and linoleic acid, an alicyclic acid such as naphthenic acid, and an aromatic acid such as carbolic acid, benzoic acid, salicylic acid and any substituted derivative thereof; a metal-based stabilizer such as a metal salt liquid stabilizer formed by dissolving these stabilizers in an organic solvent such as a petroleum hydrocarbon, an alcohol and a glycerol derivative and further blending a stabilizing auxiliary such as an ester of phosphorous acid, an epoxy compound, a color development inhibitor, a transparency modifier, a light stabilizer, an antioxidant, a bleedout inhibitor, a lubricant etc.; and a non-metallic stabilizer, for example, an epoxy compound such as an epoxy resin, epoxidized soybean oil, epoxidized vegetable oil and an alkyl ester of epoxidized fatty acid, an ester of organic phosphorous acid etc. These may be used singly or two or more kinds thereof may be used concurrently.

Examples of the lubricant include a pure hydrocarbon-based lubricant such as liquid paraffin, natural paraffin, microcrystalline wax, synthetic paraffin and polyethylene with a low molecular weight; halogenated hydrocarbon-based lubricant; a fatty acid-based lubricant such as a higher fatty acid and hydroxy fatty acid; a fatty acid amide-based lubricant such as a fatty acid amide and a bis(fatty acid amide); an ester-based lubricant such as a lower alcohol ester of a fatty acid, a polyhydric alcohol ester of a fatty acid such as glyceride, a polyglycol ester of a fatty acid and an aliphatic alcohol ester of a fatty acid (ester waxes); and in addition, a metal soap, an aliphatic alcohol, a polyhydric alcohol, a polyglycol, a polyglycerol, a partial ester of a fatty acid and a polyhydric alcohol and a partial ester of a fatty acid and a polyglycol or a polyglycerol. These may be used singly or two or more kinds thereof may be used concurrently.

Examples of the filler include an inorganic filler for example a carbonate salt such as heavy calcium carbonate, precipitated calcium carbonate and colloidal calcium carbonate, aluminum hydroxide, magnesium hydroxide, titanium oxide, clay, mica, talc, wollastonite, zeolite, silica, zinc oxide, magnesium oxide, carbon black, graphite, glass beads, a glass fiber, a carbon fiber and a metal fiber; and an organic fiber such as a polyamide. These may be used singly or two or more kinds thereof may be used concurrently.

As the flame retardant, for example, chlorinated paraffin, aluminum hydroxide, antimony trioxide and a halogen compound may be mentioned. These may be used singly or two or more kinds thereof may be used concurrently.

As the flame retardant include chlorinated paraffin, aluminum hydroxide, antimony trioxide and a halogen compound may be mentioned. These may be used singly or two or more kinds thereof may be used concurrently.

In order to produce the chlorine-containing resin composition of the invention, for example, the melt kneading method can be applied. Specifically, for example, there is a method mixing predetermined amounts of a thermoplastic resin and a processability-improving agent in the Henschel mixer, the Banbury mixer, a V-type mixer, a ribbon blender etc. and then melt-kneading the mixture thereof by a kneading extruder such as a single screw extruder and a twin screw extruder. The resin composition obtained by melt-kneading is usually produced in a pellet form. In addition, kneading may be conducted using a small amount of a solvent, if necessary.

The method for processing the chlorine-containing resin composition of the invention is not particularly limited, but a known processing method can be used. For example, the chlorine-containing resin composition can be suitably processed and molded by calendering, rolling, extrusion molding, a melt-rolling method, injection molding, compression molding, paste processing, powder molding, foam molding etc.

EXAMPLES

Hereinafter, the invention will be more specifically described with reference to Examples. In the following description, the terms "parts" and "%" each indicate "parts by mass" and "% by mass" unless particularly stated otherwise. The measurement metrics and judgment of each item were done as follows.

(1) Thermal Decomposition Temperature of Emulsifier (c)

An emulsifier of which the moisture content is adjusted to 1.0% or less by removing the moisture in a steam dryer at 70° C. was used as the specimen, and the mass decrease rate thereof was measured using the TG/DTA 6200 [Measuring device manufactured by Seiko Instruments Inc.]. The measurement condition was as follows. The emulsifier was kept for 5 minutes at 120° C. under an atmosphere of Air=200 ml/min and then measured at a temperature increasing speed of 15° C./min from 120° C. to 550° C. From the measurement results thus obtained, the temperature at which the mass of the emulsifier was decreased by 3% with respect to 100% of the mass of the emulsifier before measurement was adopted as the thermal decomposition temperature of the emulsifier.

(2) Mass Average Particle Size of Graft Copolymer (A)

The specimen was prepared by diluting the latex of the graft copolymer with deionized water so as to have a concentration of about 3%, and the mass average particle size thereof was measured using the CHDF 2000 model particle size distribution meter [Manufactured by Matec Applied Sciences, USA]. Measurement was conducted under the following standard conditions recommended by Matec Applied Sciences.
Cartridge: Dedicated capillary cartridge for particle separation [Trade name: C-202]
Carrier liquid: dedicated carrier liquid [Trade name: 2XGR500]
Acidity or alkalinity of carrier liquid: Neutral
Flow rate of carrier liquid: 1.4 ml/min
Pressure of carrier liquid: About 4,000 psi [2,600 kPa]
Measurement temperature: 35° C.
Amount of sample used: 0.1 ml As the substance having a standard particle size, monodisperse polystyrenes with known particle sizes (Manufactured by Duke Scientific Corporation, USA) were used for 12 points in a particle size range of from 40 to 800 nm.

(3) Volume Average Particle Size of Powder of Graft Copolymer (A)

The powder of the graft copolymer (A) was diluted with deionized water containing a small amount of an emulsifier and subjected to the ultrasonic treatment for 15 minutes, and the volume average particle size thereof was then measured using the SALD-7100 of a laser diffraction/scattering type particle size distribution measuring device [Measuring device manufactured by Shimadzu Corporation]. The refractive index calculated from the composition of the monomer introduced was used as the refractive index, and the median size was used as the average size for each. The concentration of the sample was appropriately adjusted so as to be in a proper range on the scattered light intensity monitor provided to the device.

(4) Specific Surface Area of Powder of Graft Copolymer (A)

The value of the specific surface area was measured after the powder of the graft copolymer (A) (Volume: 0.6 cm$^3$) was introduced into the sample tube for measurement and vacuum-dried for 12 hours at 70° C. using a specific surface area and pore distribution measuring device [Product name: Belsorp, manufactured by NIPPON BEL, Co.]. In this measurement, it is possible to adopt the value of the specific surface area calculated by the BET method of the following Equation (II).

$$P/[V(P_0-P)]=[1/(VmC)]+[(C-1)/(VmC)][P/P_0] \qquad (II)$$

P: Adsorption equilibrium pressure
$P_0$: Saturated vapor pressure
V: Adsorbed amount
Vm: Adsorbed amount of monomolecular layer, adsorbed amount when gaseous molecule forms monomolecular layer on fixed surface
C: Parameter of heat of adsorption>0

(5) pH of Water Used for Extraction of Powder of Graft Copolymer (A)

The method for measuring the pH was as follows. In a hot air circulation type dryer at 180° C., 5.0 g of the powder of the graft copolymer (A) was left to stand still and heated for 15 minutes and then dispersed in 100 ml of pure water and extracted for 1 hour at 70° C. while stirring. The water used for the extraction was filtered through a 0.2 µm membrane filter produced by cellulose mixed ester. The measurement was conducted using this filtrate as the specimen and the following measuring device, and the value measured was adopted.

Device: pH Meter, model F-52 [HORIBA, Ltd.]
Electrode: Model 9611 [HORIBA, Ltd.]
Internal solution of reference electrode: 3.33 mol/1 KC solution [HORIBA, Ltd.]
pH Standard solution: pH 4.00, pH 6.88, and pH 9.18 (25° C.)

(6) Amount of Organosiloxane Contained in Powder of Graft Copolymer (A)

The method for measuring the content of the organosiloxane was employed as follows. Into a 50 ml sample tube, 0.3 g of the powder of the graft copolymer (A) was weighed and 20 ml of acetone and 5 µl of butyl acetate were weighed and put in to the sample tube. The measurement was conducted using this as the specimen and the following measuring device, and the value measured is adopted.

Device: Gas chromatograph (GC) [HP6890 manufactured by Agilent Technologies Japan, Lit.]
Capillary column: DB-WAX
Column oven: 40° C./5 min, raising at 10° C./min, 140° C./0 min, raising at 20° C./min, 220° C./1 min, post-run=230° C./2 min, column flow rate (He)=2.3 ml/min, average linear velocity=36 cm/sec
Inlet: Temperature=200° C.
Detector: Temperature=200°, hydrogen flow rate=40 ml/min, air flow rate=450 ml/min, make-up flow rate (He) =45 ml/min
Injection amount: 1 µl (7) Charpy Impact Strength The Charpy impact strength was measured under a temperature condition of 10° C. in conformity with JIS K 7111. The test piece was fabricated as follows. The materials were kneaded at the blending proportions presented in Table 3 and Table 4 for 3 minutes using a dielectric heating type 8 inch test roll [Kneader manufactured by KANSAI ROLL Co., Ltd.] heated to 180° C., then heated for 10 minutes in a press molding machine set to 180° C., and then cooled for 5 minutes to mold a press plate, and the press plate was cut to have the following sizes and notched.

Test piece: Length 80.0 mm×width 10.0 mm×thickness 4.0 mm, notch depth: 2.0 mm

The test piece was conditioned in a low temperature incubator at −10° C. for 48 hours or longer before the start of the measurement.

(8) Gelation Time

The measurement of gelation time of the formulation was conducted under the following conditions.

<Preparation Condition of Formulation>
(a) 6.0 parts of the graft copolymer (A),
(b) 100 parts of a vinyl chloride resin, TK-1000 [Trade name, manufactured by Shin-Etsu Chemical Co., Ltd., average polymerization degree of 1050, average particle size of 150 µm],
(c) 3.0 parts of a CaZn-based stabilizer [Manufactured by SUN ACE CORPORATION],
(d) 5.0 parts of calcium carbonate, HAKUENKA CCR [Trade name, manufactured by SHIRAISHI CALCIUM KAISHA, LTD., primary particle size of 50 nm, surface treatment agent: fatty acid], and
(e) 5.0 parts of titanium dioxide, R-830 [Trade name, manufactured by ISHIHARA SANGYO KAISHA, LTD., $TiO_2$ of 93%, average particle size of 0.25 µm, oil absorption of 21].

The materials of (a) to (e) above were blended, and after a Z blade and a flat blade were mounted to a 20 L Henschel mixer, FM20C/I [Product number, manufactured by NIPPON COKE & ENGINEERING CO., LTD.] heated to 40° C., the mixture was hot blended at a frequency of 65 Hz until the internal temperature thereof reached 110° C. to obtain a formulation.

<Measurement Condition of Gelation Time>
A batch type mixer attachment [Heating type: electric heater, use temperature range of from 0 to 350° C.] was mounted to the Brabender Plasti-Corder [Measuring device manufactured by Brabender GmbH & Co. KG] and heated to 180° C., 77.55 cc of the formulation prepared in the above conditions was introduced into the measuring device, kept for 5 minutes, and kneaded at a rotation number of rotor of 30 rpm, and the time required from the start of kneading to the point at which the maximum torque was exhibited was adopted as the gelation time.

(9) Bleedout Resistance

The dirt of the roll when 50 g of the formulation was introduced into the roll bank portion of a dielectric heating type 8 inch test roll [Kneader manufactured by KANSAI ROLL Co., Ltd.] and kneaded for 30 minutes at 180° C. was visually judged according to the following criteria.

◯: There is no dirt on roll after kneading for 30 minutes.
x: There is dirt on roll after kneading for 30 minutes.

(10) Time Until to Twine

Into the roll bank portion of a dielectric heating type 8 inch test roll [Kneader manufactured by KANSAI ROLL Co., Ltd.], 50 g of the formulation was introduced and kneaded by taking the time point at which the introduction was finished as the starting time, and the time until the formulation melted and twined around the roll was measured. The temperature of the front and back rolls was set to 190° C., the rotation number of the roll was 14 rpm for the front roll and 16 rpm for the back roll, and kneading was conducted at an interspace between the front and back rolls of 0.3 mm to measure the time.

Production Example 1

Production of Polyorganosiloxane Rubber Latex (S-1)

By mixing 2 parts of tetraethoxysilane, 0.5 parts of γ-methacryloyloxypropyldimethoxymethylsilane, and 97.5 parts of octamethylcyclotetrasiloxane, 100 parts of siloxane-based mixture was obtained. To this, a solution prepared by dissolving 0.67 parts of sodium dodecylbenzenesulfonate and 0.67 parts of dodecylbenzenesulfonic acid in 233 parts of deionized water was added and stirred for 5 minutes at 10000 rpm using a homomixer. Subsequently, the mixture was passed through a homogenizer at a pressure of 20 MPa two times, thereby obtaining a stable premixed organosiloxane emulsion.

This emulsion was introduced into a separable flask equipped with a cooling condenser and heated for 5 hours at 80° C. while stirring. Thereafter, the flask was cooled and kept for 6 hours at 50° C. to polymerize the organosiloxane. Subsequently, the resultant was neutralized to pH=7.0 using 5% aqueous solution of sodium hydroxide, thereby obtaining the polyorganosiloxane rubber latex (S-1).

This polyorganosiloxane rubber latex (S-1) was dried for 30 minutes at 180° C., and the solid content thereof was determined to obtain a result of 29.8%.

Production Example 2

Production of Polyalkyl(Meth)Acrylate Rubber Latex (A-1)

Into a separable flask equipped with a cooling condenser, 4.95 parts of butyl acrylate, 0.025 parts of allyl methacrylate, 0.025 parts of 1,3-butylene glycol dimethacrylate, 0.2 parts of sodium dialkylsulfosuccinate, and 107.5 parts of deionized water were introduced and stirred for 2 hours in a nitrogen gas stream, and the internal temperature was then raised to 70° C. Subsequently, 0.01 parts of potassium persulfate and 2.5 parts of deionized water were added thereto to start the polymerization. The internal temperature was kept at 70° C. for 90 minutes to complete the polymerization, thereby obtaining the polyalkyl(meth)acrylate rubber latex (A-1).

This polyalkyl(meth)acrylate rubber latex (A-1) was dried for 30 minutes at 180° C., and the solid content thereof was determined to obtain a result of 4.3%.

Production Example 3

Production of Graft Copolymer (G-1)

Into a separable flask, 33.22 parts (9.9 parts as solid content) of the polyorganosiloxane rubber latex (S-1) obtained in Production Example 1 was introduced, and 200 parts of distilled water was added thereto and mixed together. Thereafter, a mixture of 77.5 parts of butyl acrylate, 1.6 parts of allyl methacrylate, 0.3 part of t-butyl hydroperoxide and 0.5 parts of sodium dodecylbenzenesulfonate was added thereto.

Subsequently, a nitrogen gas stream was allowed to pass through this separable flask to purge the internal atmosphere of the flask with nitrogen gas, and the temperature was raised to 60° C. At the time point at which the liquid temperature reached 60° C., an aqueous solution prepared by dissolving 0.001 parts of ferrous sulfate, 0.003 parts of ethylenediaminetetraacetic acid disodium salt, and 0.24 parts of Rongalite in 10 parts of distilled water was added thereto to conduct the radical polymerization. This state was maintained for another one hour in order to complete the polymerization, thereby obtaining a latex of a composite rubber containing a polyorganosiloxane rubber and a polyalkyl(meth)acrylate rubber.

After the liquid temperature of the latex dropped to 65° C., a liquid mixture of 10 parts of methyl methacrylate, 1 part of butyl acrylate, and 0.06 parts of cumene hydroperoxide was added to the latex dropwise over 30 minutes to conduct the polymerization. After finishing the dropwise addition, the state having a temperature of 60° C. or higher was maintained for 1 hour and then cooled, thereby obtaining a latex of the graft copolymer (G-1) in which a methyl methacrylate-butyl acrylate copolymer was grafted onto the composite rubber. The mass average particle size of this graft copolymer (G-1) is presented in Table 1.

Production Example 4 to 6

Production of Graft Copolymers (G-2) to (G-4)

The graft polymers were obtained in the same manner as in Production Example 3 except that the kind of the additional emulsifiers was changed as presented in Table 1. The mass average particle size of the graft copolymers (G-2) to (G-4) is presented in Table 1.

Production Example 7

Production of Graft Copolymer (G-5)

To the polyalkyl(meth)acrylate rubber latex (A-1) latex obtained in Preparation Example 2, an aqueous solution prepared by dissolving 0.0003 parts of ferrous sulfate, 0.0009 parts of ethylenediaminetetraacetic acid disodium salt, and 0.03 parts of Rongalite in 2.5 parts of deionized water was added.

Subsequently, a liquid mixture of 69.3 parts of butyl acrylate, 0.7 parts of allyl methacrylate, 0.35 parts of 1,3-butylene glycol dimethacrylate, 0.35 parts of t-butyl hydroperoxide, 0.6 parts of sodium dialkylsulfosuccinate, and 35 parts of deionized water was added thereto dropwise over 2 hours, and the internal temperature was kept at 70° C. for 90 minutes to complete the polymerization, thereby obtaining a latex of an acrylic rubber. The solid content of this latex of the acrylic rubber was 33.5%.

To this acrylic rubber latex, 0.1 parts of sodium dialkyl-sulfosuccinate, 0.03 parts of Rongalite, and 2.5 parts of deionized water were added. Subsequently, 20 parts of methyl methacrylate, 5 parts of isobutyl methacrylate, 0.25 parts of t-butyl hydroperoxide were added thereto dropwise over 1 hour, the internal temperature was kept at 70° C. for 90 minutes to complete the polymerization, thereby obtaining a latex (solid content of 39.8%) of the graft copolymer (G-5). The mass average particle size of this graft copolymer (G-5) is presented in Table 1.

treatment under the following conditions using an atomizer type spray dryer (Manufactured by OHKAWARA KAKOKI CO., LTD., L8 spray dryer) to obtain the powder (B-1) of the graft copolymer.

<Condition of Spray Drying Treatment>

Spray method: Rotating disc type

Disk rotation number: 25000 rpm

Hot air temperature: Inlet temperature=150° C., outlet temperature=65° C.

The volume average particle size and specific surface area of the powder (B-1) of the graft copolymer thus obtained,

TABLE 1

| | | Kind of graft copolymer (A) | | Production Example 3 G-1 | Production Example 4 G-2 | Production Example 5 G-3 | Production Example 6 G-4 | Production Example 7 G-5 |
|---|---|---|---|---|---|---|---|---|
| Rubber latex | | | Kind | S-1 | S-1 | S-1 | S-1 | A-1 |
| | | | Parts | 9.9 | 9.9 | 9.9 | 9.9 | 5.0 |
| | Emulsifier | NEOPELEX G15 | Parts | 0.1 | 0.1 | 0.1 | 0.1 | — |
| | | PELEX OTP | Parts | — | — | — | — | 0.2 |
| | | Thermal decomposition temperature | ° C. | 275 | 275 | 275 | 275 | 224 |
| Composite rubber moiety | Composition | BA | Parts | 77.5 | 77.5 | 77.5 | 77.5 | 69.3 |
| | | AMA | Parts | 1.6 | 1.6 | 1.6 | 1.6 | 0.7 |
| | | NEOPELEX G15 | Parts | 0.5 | — | — | — | — |
| | | PELEX SSL | Parts | — | 0.5 | — | — | — |
| | | EMULGEN A90 | Parts | — | — | 0.5 | — | — |
| | Emulsifier | EMAL 20C | Parts | — | — | — | 0.5 | — |
| | | PELEX OTP | Parts | — | — | — | — | 0.6 |
| | | Thermal decomposition temperature | ° C. | 275 | 250 | 268 | 176 | 224 |
| Graft moiety | Composition | MMA | Parts | 10 | 10 | 10 | 10 | 20 |
| | | BA | Parts | 1 | 1 | 1 | 1 | — |
| | | i-BMA | Parts | — | — | — | — | 5 |
| | Emulsifier | PELEX OTP | Parts | — | — | — | — | 0.1 |
| | | Thermal decomposition temperature | ° C. | — | — | — | — | 224 |
| Mass average particle size | Graft copolymer (A) | | nm | 243 | 238 | 249 | 210 | 240 |

The abbreviations in Table 1 denote the following compounds.

"NEOPELEX G15": Sodium dodecylbenzenesulfonate (Manufactured by Kao Corporation, trade name: NEOPELEX G15)

"PELEX SSL": Sodium alkyl diphenyl ether disulfonate (Manufactured by Kao Corporation, trade name: PELEX SSL)

"EMULGEN A90": Polyoxyethylene distyrenated phenyl ether (Manufactured by Kao Corporation, trade name: EMULGEN A90)

"EMAL 20C": Sodium polyoxyethylene alkyl ether sulfate (Manufactured by Kao Corporation, trade name: EMAL 20C)

"PELEX OTP": Sodium dialkyl sulfosuccinate (Manufactured by Kao Corporation, trade name: PELEX OTP)

"BA": n-Butyl acrylate
"MMA": Methyl methacrylate
"AMA": Allyl methacrylate
"i-BMA": isobutyl methacrylate Production Example 8

Production of Powder of Graft Copolymer (B-1)

The latex of the graft copolymer (G-1) obtained in Production Example 3 was subjected to the spray drying pH of water used for the extraction thereof, and the amount of the organosiloxane contained therein are presented in Table 2.

Production Examples 9, 10, 11 and 13

Production of Powders (B-2), (B-3), (B-4) and (B-6) of Graft Copolymer

The powders (B-2), (B-3), (B-4) and (B-6) of the graft copolymer were obtained by conducting the same spray drying treatment as in Production Example 8 except that the kind of the graft copolymers was changed as presented in Table 2. The volume average particle sizes and specific surface areas of the powders thus obtained, pH's of water used for the extraction thereof, and the amounts of the organosiloxane contained therein are presented in Table 2.

Production Example 12

Production of Powder (B-5) of Graft Copolymer

The latex (G-1) of the graft copolymer obtained in Production Example 3 was gradually added to 500 parts of an aqueous solution prepared by dissolving aluminum sulfate at a proportion of 2.5% dropwise while heating at 35° C. to coagulate. After finishing the dropwise addition, the resultant was completely solidified by further heating up to 80° C. This is separated, washed with water, and dried, thereby obtaining the powder (B-5) of the graft copolymer.

The volume average particle size and specific surface area of the powder (B-5) of the graft copolymer thus obtained, pH of water used for the extraction thereof, and the amount of the organosiloxane contained therein are presented in Table 2. As well, the respective measuring methods of these are as previously described.

(e) 5.0 parts of titanium dioxide, R-830 [Trade name, manufactured by ISHIHARA SANGYO KAISHA, LTD., $TiO_2$ of 93%, average particle size of 0.25 oil absorption of 21].

The materials of (a) to (e) above were blended, a Z blade and a flat blade were mounted to a 20 L Henschel mixer, FM20C/I [product number, manufactured by NIPPON COKE & ENGINEERING CO., LTD.] heated to 40° C., and

TABLE 2

| Kind of powder of graft copolymer (A) | | Production Example 8 B-1 | Production Example 9 B-2 | Production Example 10 B-3 | Production Example 11 B-4 | Production Example 12 B-5 | Production Example 13 B-6 |
|---|---|---|---|---|---|---|---|
| Graft copolymer (A) | Kind | G-1 | G-2 | G-3 | G-4 | G-1 | G-5 |
| Recovery method | — | SD | SD | SD | SD | Coagulation | SD |
| Volume average particle size | μm | 56 | 58 | 68 | 51 | 201 | 68 |
| Specific surface area | $m^2/g$ | 2.7 | 3.2 | 2.9 | 2.0 | 0.3 | 2.9 |
| pH of water used for extraction | pH | 4.6 | 4.1 | 5.4 | 3.6 | 3.6 | 4.5 |
| Amount of organosiloxane contained | % | 0.13 | 0.15 | 0.16 | 0.18 | 0.19 | 0.00 |

The abbreviations in Table 2 denote the following methods.
"SD": Spray drying (Spray drying method)
"Coagulation": Coagulation method Examples 1 to 3 and Comparative Examples 1 to 3

The formulations 1 to 6 were produced using the powder particles (B-1) to (B-6) of the graft copolymer obtained in Production Examples 8 to 13 and at the blending proportions presented in Table 3 as following conditions.
<Preparation Conditions of Formulations 1 to 6>
(a) 6.0 parts of the graft copolymer (A),
(b) 100 parts of a vinyl chloride resin, TK-1000 [Trade name, manufactured by Shin-Etsu Chemical Co., Ltd., average polymerization degree of 1050, average particle size of 150 μm], (c) 3.0 parts of a CaZn-based stabilizer [Manufactured by SUN ACE CORPORATION], (d) 5.0 parts of calcium carbonate, HAKUENKA CCR [Trade name, manufactured by SHIRAISHI CALCIUM KAISHA, LTD., primary particle size of 50 nm, surface treatment agent: fatty acid], and the mixture was hot blended at a frequency of 65 Hz until the internal temperature thereof reached 110° C. to obtain the formulations 1 to 7.

These were kneaded for 3 minutes using a dielectric heating type 8 inch test roll [Kneader manufactured by KANSAI ROLL Co., Ltd.] heated to 180° C., then heated for 10 minutes in a press molding machine set to 180° C., and then cooled for 5 minutes to obtain plate-shaped test pieces having dimensions of length 200 mm×width 200 mm×thickness 4.0 mm. This test piece was cut according to the evaluation method and subjected to the evaluation. The results are presented in Table 3.

TABLE 3

| | | Example 1 Formulation 1 (parts) | Example 2 Formulation 2 (parts) | Example 3 Formulation 3 (parts) | Comparative Example 1 Formulation 4 (parts) | Comparative Example 2 Formulation 5 (parts) | Comparative Example 3 Formulation 6 (parts) |
|---|---|---|---|---|---|---|---|
| Vinyl chloride resin | | 100 | 100 | 100 | 100 | 100 | 100 |
| CaZn-based stabilizer | | 3.0 | 3.0 | 3.0 | 3.0 | 3.0 | 3.0 |
| Calcium carbonate | | 5.0 | 5.0 | 5.0 | 5.0 | 5.0 | 5.0 |
| Titanium dioxide | | 5.0 | 5.0 | 5.0 | 5.0 | 5.0 | 5.0 |
| Graft copolymer | (B-1) | 6.0 | | | | | |
| powder particles | (B-2) | | 6.0 | | | | |
| | (B-3) | | | 6.0 | | | |
| | (B-4) | | | | 6.0 | | |
| | (B-5) | | | | | 6.0 | |
| | (B-6) | | | | | | 6.0 |
| Charpy impact strength: −10° C. ($kJ/m^2$) | | 5.4 | 5.1 | 5.1 | 4.0 | 4.5 | 2.6 |
| Gelation time (sec) | | 186.0 | 208.0 | 204.0 | 224.0 | 220.0 | 200.5 |
| Bleedout resistance | | ○ | ○ | ○ | X | ○ | ○ |

Examples 4 to 6 and Comparative Examples 4 to 6

The formulations 7 to 12 were produced using the powder particles (B-1) to (B-6) of the graft copolymer obtained in Production Examples 8 to 13 and at the blending proportions presented in Table 4 as following conditions.

<Preparation Condition of Formulations 7 to 12>

(a) 6.0 parts of the graft copolymer (A), (b) 100 parts of a chlorinated vinyl chloride resin, HA-17F [Trade name manufactured by SEKISUI CHEMICAL CO., LTD., chlorine content of 64% by weight], (c) 4.0 parts of dibutyl tin bisthioglycolate [Manufactured by NITTO KASEI CO., LTD.], (d) 1.5 parts of partially oxidized polyethylene wax, PE-220 [Trade name, manufactured by Mitsui Chemicals Inc.], and (e) 5.0 parts of titanium dioxide, R-830 [trade name, manufactured by ISHIHARA SANGYO KAISHA, LTD., $TiO_2$ of 93%, average particle size of 0.25 µm, oil absorption of 21].

The materials of (a) to (e) above were blended, a Z blade and a flat blade were mounted to a 20 L Henschel mixer, FM20C/I [Product number, manufactured by NIPPON COKE & ENGINEERING CO., LTD.] heated to 40° C., and the mixture was hot blended at a frequency of 65 Hz until the internal temperature thereof reached 110° C. to obtain the formulations 7 to 12.

These were kneaded for 3 minutes using a dielectric heating type 8 inch test roll [Kneader manufactured by KANSAI ROLL Co., Ltd.] heated to 190° C., then heated for 10 minutes in a press molding machine set to 190° C., and then cooled for 5 minutes to obtain plate-shaped test pieces having dimensions of length 200 mm×width 200 mm×thickness 4.0 mm. This test piece was cut according to the evaluation method and subjected to the evaluation. The results are presented in Table 4.

exhibits inferior processability. Comparative Example 3 in which the graft copolymer (B-6) not containing a polyorganosiloxane rubber or a composite rubber thereof has been blended has a short gel time, that is, exhibits favorable processability, but has an insufficient low temperature impact strength.

Furthermore, as evidenced by the results in Table 4, it has been confirmed that Examples 4 to 6 in which the graft copolymers (B-1) to (B-3) have been blended with a chlorinated vinyl chloride resin also maintain a practically sufficient low temperature impact strength, have a short time until to twine, that is, exhibit excellent processability.

On the other hand, it has been confirmed that Comparative Example 4 in which the graft copolymer (B-4) having a pH of water used for extraction of 4 or less has been blended has a lower low temperature impact strength and a longer time until to twine, that is, exhibits inferior processability as compared to Examples. In addition, Comparative Example 5 in which the graft copolymer (B-5) having a specific surface area of less than 0.6 $m^2/g$ and a pH of water used for extraction of less than 4 has been blended has a practically sufficient low temperature impact strength but a long time until to twine, that is, exhibits inferior processability. Comparative Example 6 in which the graft copolymer (B-6) not containing a polyorganosiloxane rubber or a composite rubber thereof has been blended has a short time until to twine, that is, exhibits favorable processability but has an insufficient low temperature impact strength.

As described above, it has been confirmed that the impact strength modifier for a chlorine-containing resin of the

TABLE 4

|  |  | Example 4 Formulation 7 (parts) | Example 5 Formulation 8 (parts) | Example 6 Formulation 9 (parts) | Comparative Example 4 Formulation 10 (parts) | Comparative Example 5 Formulation 11 (parts) | Comparative Example 6 Formulation 12 (parts) |
|---|---|---|---|---|---|---|---|
| Chlorinated vinyl chloride resin |  | 100 | 100 | 100 | 100 | 100 | 100 |
| Dibutyl tin bisthioglycolate |  | 40 | 4.0 | 4.0 | 4.0 | 4.0 | 4.0 |
| Partially oxidized polyethylene wax |  | 1.5 | 1.5 | 1.5 | 1.5 | 1.5 | 1.5 |
| Titanium dioxide |  | 5.0 | 5.0 | 5.0 | 5.0 | 5.0 | 5.0 |
| Graft copolymer | (B-1) | 6.0 |  |  |  |  |  |
| powder particles | (B-2) |  | 6.0 |  |  |  |  |
|  | (B-3) |  |  | 6.0 |  |  |  |
|  | (B-4) |  |  |  | 6.0 |  |  |
|  | (B-5) |  |  |  |  | 6.0 |  |
|  | (B-6) |  |  |  |  |  | 6.0 |
| Charpy impact strength: −10° C. ($kJ/m^2$) |  | 2.5 | 2.4 | 2.2 | 1.9 | 2.1 | 1.7 |
| Time until to twine (sec) |  | 58.0 | 57.0 | 52.0 | 108.0 | 69.0 | 58.0 |

(Evaluation)

As evidenced by the results in Table 3, it has been confirmed that Examples 1 to 3 in which the graft copolymers (B-1) to (B-3) have been blended with a vinyl chloride resin maintain a practically sufficient low temperature impact strength, have a short gelation time, that is, exhibit excellent processability, and exhibit bleedout resistance.

On the other hand, it has been confirmed that Comparative Example 1 in which the graft copolymer (B-4) having a pH of water used for extraction of less than 4 has been blended has a lower low temperature impact strength and a longer gelation time, that is, exhibits inferior processability, and exhibits inferior bleedout resistance as compared to Examples. In addition, Comparative Example 2 in which the graft copolymer (B-5) having a specific surface area of less than 0.6 $m^2/g$ and a pH of water used for extraction of less than 4 has been blended has a practically sufficient low temperature impact strength but a long gelation time, that is, invention can improve the low temperature impact strength without deteriorating the processability in case of being blended and kneaded with a chlorine-containing resin.

INDUSTRIAL APPLICABILITY

It is possible to improve the low temperature impact strength without deteriorating the processability when the impact strength modifier (α) for a chlorine-containing resin of the invention is blended into and kneaded with the chlorine-containing resin (β). Hence, the chlorine-containing resin composition of the invention is useful for a variety of molded articles as various kinds of industrial materials. For example, it can be suitably used for applications such as a film, a bottle, a tray, a plate, a package, a pipe and a sheet. In addition to these, it can also be used, for example, in building materials such as a wall material, a flooring material, a window frame, a wall material, a corrugated plate, and a rain gutter; interior and exterior materials for motor vehicle; fish food packaging materials; and general goods such as packing, a gasket, a hose, a joint and a toy.

The invention claimed is:

1. An impact strength modifier (α) for a chlorine-containing resin,
wherein the impact strength modifier comprises a powder of a graft copolymer (A) obtained by graft polymerizing one or more vinyl monomers (b1) onto a polyorganosiloxane rubber (A1) or a composite rubber (A2) containing a polyorganosiloxane rubber and a polyalkyl (meth)acrylate rubber, and
wherein
a specific surface area of the powder of the graft copolymer (A) measured by a nitrogen gas adsorption method is from 0.6 to 30 $m^2/g$ and
water used for extraction under the following conditions (1) and (2) is at a pH of from 4 to 11:
(1) in an oven at 180° C., 5.0 g of the powder of the graft copolymer (A) is left to stand still and heated for 15 minutes, and
(2) after the heating, the powder is dispersed in 100 ml of water and extracted for 1 hour at 70° C. while stirring,
wherein a gelation time of the powder of the graft polymer (A) measured under the following conditions is 215 seconds or less;
<Preparation of formulation>
(a) 100 parts by mass of a vinyl chloride resin with an average polymerization degree of 1050 and an average particle size of 150 μm,
(b) 6.0 parts by mass of the powder of the graft copolymer (A),
(c) 3.0 parts by mass of a CaZn-based stabilizer,
(d) 5.0 parts by mass of calcium carbonate with a primary particle size of 50 nm and a fatty acid as a surface treatment agent, and
(e) 5.0 parts by mass of titanium dioxide ($TiO_2$) of 93%, with an average particle size of 0.25 μm, and an oil absorption of 21,
are blended, and in a 20 L Henschel mixer mounted a Z blade and a flat blade and heated to 40° C.,
are hot blended at a frequency of 65 Hz until the internal temperature thereof reaches 110° C. to obtain a formulation:
<Measurement condition>
(1) the inside of the measuring device is heated to 180° C.,
(2) into the measuring device, 77.55 cc of the formulation is introduced, maintained for 5 minutes, and kneaded at a rotation number of rotor of 30 rpm,
(3) the time required from the start of kneading to the point at which the maximum torque is exhibited is measured as the gelation time.

2. The impact strength modifier (α) for a chlorine-containing resin according to claim 1, wherein the powder of the graft copolymer (A) is obtained by spray drying latex of the graft copolymer (A).

3. The impact strength modifier (α) for a chlorine-containing resin according to claim 1, wherein a content of an emulsifier having a thermal decomposition temperature measured by a TG/DTA measuring device of less than 200° C. is 0.1 parts by mass or less with respect to 100 parts by mass of the modifier (α), and the emulsifier is either an anionic emulsifier or a nonionic emulsifier other than a salt of sulfuric acid ester.

4. The impact strength modifier (α) for a chlorine-containing resin according to claim 1, wherein the impact strength modifier further comprises at least one kind of emulsifier selected from the group consisting of sodium dodecylbenzenesulfonate, sodium alkyl diphenyl ether disulfonate, sodium dialkylsulfosuccinate and a polyoxyethylene distyrenated phenyl ether.

5. The impact strength modifier (α) for a chlorine-containing resin according to claim 1, wherein an amount of an organosiloxane contained in the powder of the graft copolymer (A) is 0.4% by mass or less.

6. The impact strength modifier (α) for a chlorine-containing resin according to claim 1, wherein the vinyl monomer (b1) is at least one monomer selected from the group consisting of an aromatic alkenyl compound, an ester of (meth)acrylic acid and a vinyl cyanide compound.

7. A chlorine-containing resin composition, comprising the impact strength modifier (α) for a chlorine-containing resin according to claim 1 and a chlorine-containing resin (β).

8. The chlorine-containing resin composition according to claim 7, wherein the composition contains the impact strength modifier (α) for a chlorine-containing resin at from 0.1 to 30 parts by mass with respect to 100 parts by mass of the chlorine-containing resin (β).

9. A molded body obtained by molding the chlorine-containing resin composition according to claim 7.

10. A molded body obtained by molding the chlorine-containing resin composition according to claim 8.

* * * * *